(12) United States Patent
Gadd et al.

(10) Patent No.: US 11,572,045 B2
(45) Date of Patent: Feb. 7, 2023

(54) CONTROLLING AIRCRAFT WHEEL BRAKES

(71) Applicant: AIRBUS OPERATIONS LIMITED, Bristol (GB)

(72) Inventors: Matthew Gadd, Bristol (GB); David Reid, Bristol (GB)

(73) Assignee: Airbus Operations Limited, Bristol (GB)

( * ) Notice: Subject to any disclaimer, the term of this patent is extended or adjusted under 35 U.S.C. 154(b) by 754 days.

(21) Appl. No.: 16/561,371

(22) Filed: Sep. 5, 2019

(65) Prior Publication Data

US 2020/0079332 A1 Mar. 12, 2020

(30) Foreign Application Priority Data

Sep. 7, 2018 (GB) ..................................... 1814604

(51) Int. Cl.
| | | |
|---|---|---|
| *B60T 8/17* | (2006.01) | |
| *B60T 17/22* | (2006.01) | |
| *F16D 66/02* | (2006.01) | |
| *B64C 25/42* | (2006.01) | |
| *F16D 66/00* | (2006.01) | |

(52) U.S. Cl.
CPC .......... *B60T 8/1703* (2013.01); *B60T 17/221* (2013.01); *B64C 25/42* (2013.01); *F16D 66/00* (2013.01); *F16D 66/021* (2013.01); *B60T 2270/88* (2013.01); *F16D 2066/001* (2013.01)

(58) Field of Classification Search
CPC .. B60T 8/1703; B60T 17/221; B60T 2270/88; B60T 5/00; B60T 17/22; B64C 25/42; B64C 25/426; F16D 66/00; F16D 66/021; F16D 2066/001; F16D 65/78
See application file for complete search history.

(56) References Cited

U.S. PATENT DOCUMENTS

| | | | |
|---|---|---|---|
| 6,530,625 | B2 | 3/2003 | Arnold et al. |
| 7,865,289 | B2 | 1/2011 | Dellac et al. |
| 7,987,036 | B2 | 7/2011 | Dellac et al. |
| 8,151,944 | B2 | 4/2012 | Waltz |
| 8,311,685 | B2 | 11/2012 | Dellac et al. |
| 8,538,604 | B2 | 9/2013 | Thibault |
| 9,061,661 | B2 | 6/2015 | Vaney et al. |
| 9,096,204 | B2 | 8/2015 | Cahill et al. |
| 9,126,572 | B2 | 9/2015 | Vaney et al. |

(Continued)

FOREIGN PATENT DOCUMENTS

| | | |
|---|---|---|
| CN | 105752053 | 7/2016 |
| GB | 2549736 | 11/2017 |

*Primary Examiner* — Thomas Ingram
(74) *Attorney, Agent, or Firm* — Nixon & Vanderhye P.C.

(57) ABSTRACT

A method for controlling the application of aircraft wheel brakes including: controlling the application of a first wheel brake of an aircraft and a second wheel brake of the aircraft in dependence upon a determined relationship to control the time taken for the first wheel brake and the second wheel brake to reach respective specified temperatures. The relationship is determined between a first cooling characteristic of the first wheel brake, according to which the first wheel brake cools when in a first retracted position within the aircraft, and a second cooling characteristic of the second wheel brake, according to which the second wheel brake cools when in a second retracted position within the aircraft.

21 Claims, 4 Drawing Sheets

(56) References Cited

U.S. PATENT DOCUMENTS

| | | |
|---|---|---|
| 9,180,855 B2 | 11/2015 | Georgin |
| 9,815,443 B2 | 11/2017 | Miller |
| 9,914,442 B2 | 3/2018 | Kanemori et al. |
| 2008/0201025 A1* | 8/2008 | Dellac .................. B60T 8/1703 |
| | | 701/3 |
| 2010/0109429 A1* | 5/2010 | Griffith .................. B64C 25/00 |
| | | 303/121 |
| 2015/0224974 A1* | 8/2015 | Georgin .................. F16D 65/78 |
| | | 701/32.9 |
| 2015/0286215 A1* | 10/2015 | Alvarado, Jr. ......... B64D 45/00 |
| | | 701/3 |
| 2016/0214593 A1* | 7/2016 | Georgin .................. G01K 13/08 |
| 2017/0305577 A1* | 10/2017 | Bill ........................ B60T 17/22 |
| 2018/0370504 A1 | 12/2018 | Bill et al. |

\* cited by examiner

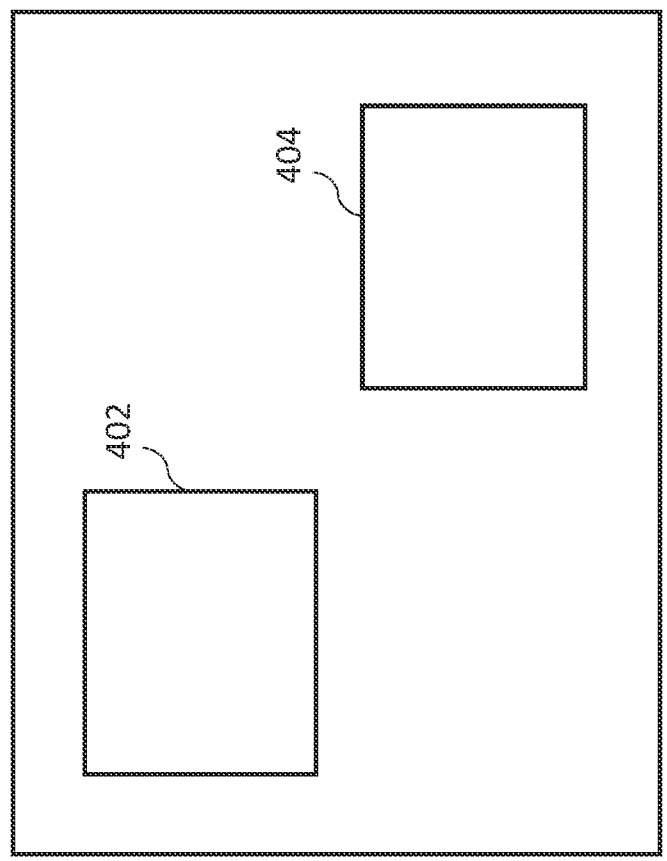
Figure 4

CONTROLLING AIRCRAFT WHEEL BRAKES

RELATED APPLICATION

This application claims priority to United Kingdom Patent Application GB 1814604.3 filed Sep. 7, 2018, the entire contents of which is incorporated by reference.

TECHNICAL FIELD

The present invention relates to the control of aircraft wheel brakes. Specifically, but not exclusively, the invention relates to controlling the application of wheel brakes of an aircraft in order to control the time taken for the aircraft wheel brakes to reach respective specified temperatures.

BACKGROUND

Aircraft wheel brakes are applied to provide braking to reduce the speed of the aircraft. When the brakes are being applied, their temperature may increase. For safe operation of the aircraft, the aircraft may not be permitted to depart for a subsequent flight until all brakes of the aircraft are at or below a temperature judged to be safe for departure. This may be, for example, to avoid the brakes heating up to temperatures beyond the safe operating range of the brakes. The amount of time required for the aircraft to be cleared for the subsequent flight may be referred to as the turn-around time. It may be advantageous to operate the aircraft in a manner so as to minimize the turn-around time for efficient operation of the aircraft.

SUMMARY

A first aspect of the present invention provides a method of controlling the application of aircraft wheel brakes, the method comprising: controlling the application of a first wheel brake of an aircraft and a second wheel brake of the aircraft in dependence upon a determined relationship in order to control the time taken for the first wheel brake and the second wheel brake to reach respective specified temperatures, wherein, the relationship is determined between a first cooling characteristic of the first wheel brake, according to which the first wheel brake cools when in a first retracted position within the aircraft, and a second cooling characteristic of the second wheel brake, according to which the second wheel brake cools when in a second retracted position within the aircraft.

Optionally, the method comprises determining at least the first cooling characteristic and/or the second cooling characteristic.

Optionally, the first cooling characteristic is determined based on a first wear indication which indicates the wear state of the first wheel brake; and/or the second cooling characteristic is determined based on a second indication which indicates the wear state of the second wheel brake.

Optionally, the method comprises determining the relationship between the first cooling characteristic and the second cooling characteristic.

Optionally, the respective specified temperatures are equal.

Optionally, the determined relationship indicates a desired temperature difference between the first wheel brake and the second wheel brake, when the first wheel brake is moved to the first retracted position and the second wheel brake is moved to the second retracted position, expected to equalize the time taken for the wheel brakes to reach respective specified temperatures.

Optionally, the method comprises: distributing braking among the first wheel brake and the second wheel brake by applying brake pressure to the first wheel brake and the second wheel brake in a manner so as to achieve the desired temperature difference.

Optionally, the method comprises: adjusting brake pressure applied to the first wheel brake and the second wheel brake based on measurements received from a first temperature sensor associated with the first wheel brake and a second temperature sensor associated with the second wheel brake.

Optionally, the determined relationship indicates a ratio according to which braking is to be distributed between the first wheel brake and the second wheel brake.

Optionally, the method comprises: distributing braking among the first wheel brake and the second wheel brake by applying braking pressure to the first wheel brake and the second wheel brake according to the ratio.

Optionally, the method comprises: adjusting the brake pressure applied to the first wheel brake and the second wheel brake based on measurements received from a first brake pressure sensor associated with the first wheel brake and a second brake pressure sensor associated with the second wheel brake.

Optionally, the method comprises: distributing braking among the first wheel brake and the second wheel brake such that torque is reacted by the first wheel brake and the second wheel brake according to the ratio.

Optionally, the method comprises: adjusting the brake pressure applied to the first wheel brake and the second wheel brake based on measurements received from a first torque sensor associated with the first wheel brake a second torque sensor associated with the second wheel brake.

Optionally, the first cooling characteristic comprises a first cooling rate according to which the first wheel brake cools when in the first retracted position within the aircraft; and the second cooling characteristic comprises a second cooling rate according to which the second wheel brake cools when in the second retracted position within the aircraft.

Optionally, the rate of cooling of the first wheel brake is higher than the rate of cooling of the second wheel brake.

Optionally, controlling the application of the first wheel brake and the second wheel brake comprises: applying the first wheel brake in accordance with a first adjustment factor; and applying the second wheel brake in accordance with a second adjustment factor.

A second aspect of the present invention provides a system for controlling the application of aircraft wheel brakes to control the time taken for the aircraft wheel brakes to reach respective specified temperatures, the system comprising one or more processors configured to: determine a first cooling characteristic of a first wheel brake of an aircraft according to which the first wheel brake cools when in a first retracted position within the aircraft; determine a second cooling characteristic of a second wheel brake of the aircraft according to which the second wheel brake cools when in a second retracted position within the aircraft; determine a relationship between the first cooling characteristic and the second cooling characteristic; and control the application of the first wheel brake and the second wheel brake in dependence upon the determined relationship.

A third aspect of the present invention provides an apparatus for controlling the application of aircraft wheel brakes, the apparatus comprising a processor configured to: control the application of a first wheel brake of an aircraft and a second wheel brake of the aircraft in dependence upon a determined relationship in order to control the time taken for the first wheel brake and the second wheel brake to reach respective specified temperatures, wherein, the relationship is determined between a first cooling characteristic of the first wheel brake, according to which the first wheel brake cools when in a first retracted position within the aircraft, and a second cooling characteristic of the second wheel brake, according to which the second wheel brake cools when in a second retracted position within the aircraft.

A fourth aspect of the present invention provides an aircraft comprising the apparatus according to the third aspect.

BRIEF DESCRIPTION OF THE DRAWINGS

Embodiments of the invention will now be described, by way of example only, with reference to the accompanying drawings, in which:

FIG. 4 is a schematic diagram of a computing apparatus on which examples may be deployed.

DETAILED DESCRIPTION

The following disclosure relates to the control of aircraft wheel brakes. More specifically, but not exclusively, the invention relates to controlling aircraft wheel brakes in a manner so as to control the time taken for the aircraft wheel brakes to reach respective specified temperatures. For example, the brakes may be controlled such that the brakes reach respective specified temperatures at about the same time. Controlling the time taken for brakes to reach certain temperatures when they cool may advantageously reduce the turn-around time of the aircraft in question.

Figure 1:
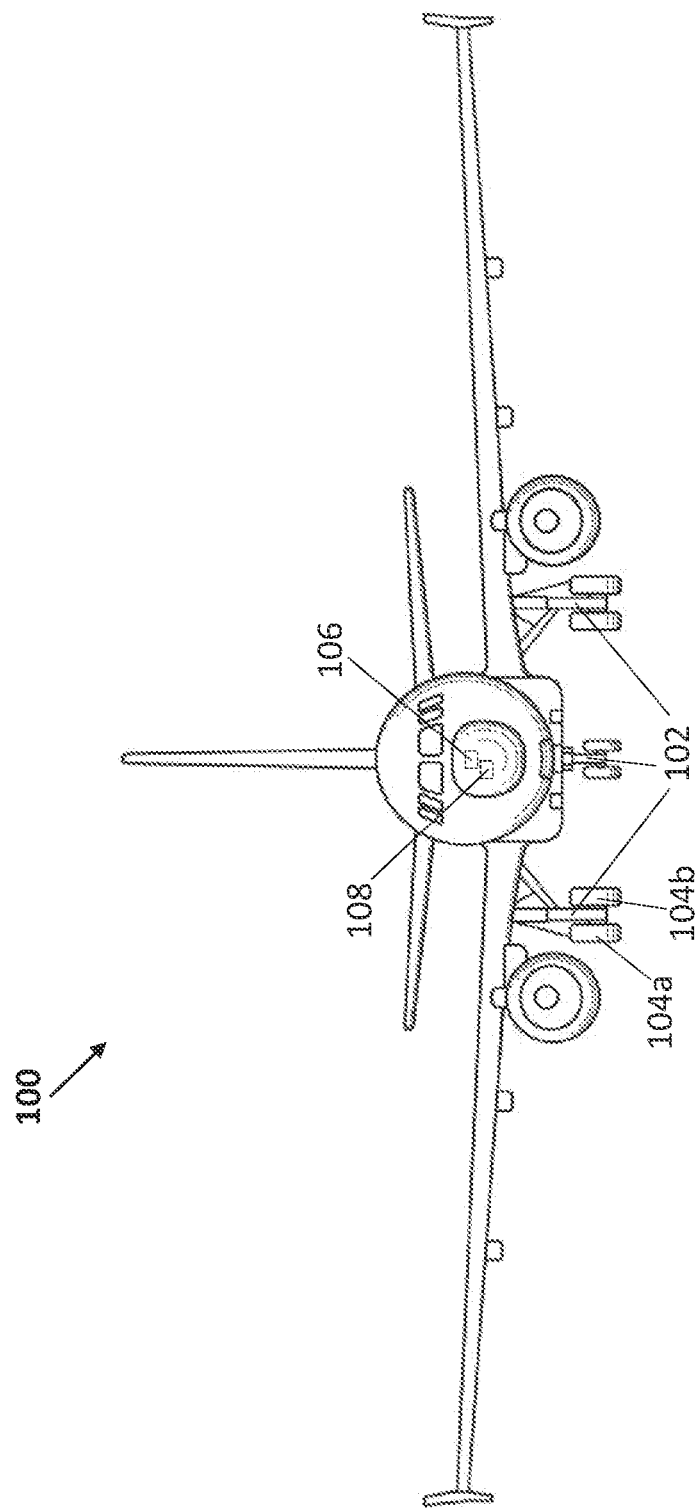
FIG. 1 is a schematic diagram of an aircraft on which examples may be deployed.

FIG. 1 is a simplified schematic diagram of an aircraft 100. The aircraft 100 comprises a plurality of landing gear assemblies 102. The landing gear assemblies 102 may include main and nose landing gears that may be extended during take-off and landing. The landing gear assemblies 102 may be retracted into respective landing gear bays (not shown in FIG. 1) when their use is not required, for example, in the time between take-off and an appropriate time before landing.

Each landing gear assembly 102 includes wheels such as a first wheel 104a and a second wheel 104b. A plurality of the wheels of the aircraft 100 may have associated with them respective wheel brakes, the wheel brakes being arranged to inhibit the rotation of their respective wheels, when applied. The aircraft 100 comprises a computing system 106, which may comprise one or more processors and one or more computer readable storage media. The aircraft 100 may also comprise devices 108, such as instruments or sensors for measuring characteristics or parameters related to the aircraft 100, and instruments or sensors for measuring environmental characteristics. In FIG. 1, the computing system 106 and the devices 108 are each represented by single blocks. However, it will be appreciated that elements of the computing system 106 and the devices 108 may be located at various different locations on the aircraft 100. The computing system 106 and the devices 108 may be located at any appropriate location on the aircraft 100.

Figure 2:
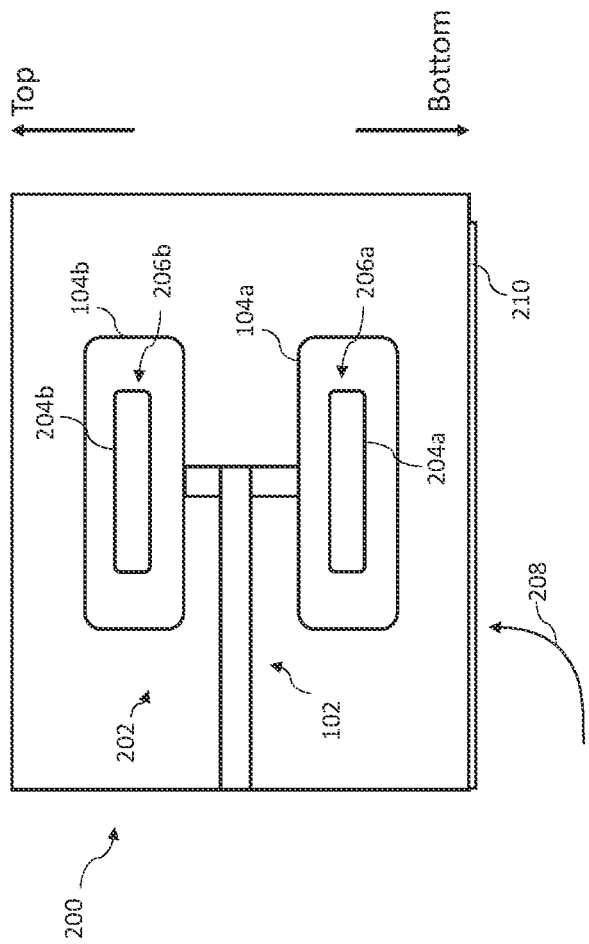
FIG. 2 is a schematic diagram of a landing gear bay of the aircraft of FIG. 1.

FIG. 2 is a schematic diagram of a landing gear assembly 102 when retracted into a landing gear bay 200 of the aircraft 100. In this example, the landing gear assembly 102 is pivoted by about 90° when in a landing gear retracted position 202 as shown in FIG. 2, as compared to when the landing gear assembly 200 is extended as shown in FIG. 1. The pivoting motion is indicated by arrow 208 in FIG. 2. To denote the orientation of the landing gear assembly 102 when retracted, FIG. 2 includes arrows labelled Top and Bottom, which coincide with the positions of the top and bottom parts of the aircraft 100 relative to the orientation of the landing gear assembly 102 when retracted.

In this example, the first wheel 104a has associated with it a first wheel brake 204a (hereinafter, first brake 204a). The first brake 204a is mounted relative to the first wheel 104a so as to inhibit the rotation of the first wheel 104a when applied. The second wheel 104b has associated with it a second wheel brake 204b (hereinafter, second brake 204b). The second brake 204b is mounted relative to the second wheel 104b so as to inhibit the rotation of the second wheel 104b when applied.

When the landing gear assembly 102 is in the landing gear retracted position 202, the first brake 204a is in a first retracted position 206a, and the second brake 204b is in a second retracted position 206b. In this example, the second retracted position 206b is above the first retracted position 206a. The aircraft 100 comprises a mechanism (not shown) for moving the landing gear assembly 102 from the extended position to the retracted position 202, for example, a hydraulic mechanism associated with the landing gear assembly 102 and arranged to extend and retract the landing gear assembly 102.

The first and second brakes 204a, 204b may be applied when the aircraft 100 is supported on the ground by the landing gear assembly 102 in the extended position shown in FIG. 1. The first and second brakes 204a, 204b may each comprise a plurality of brake discs including a pressure plate, a reaction plate, and a number of rotors and stators. The brake discs may include a plurality of rotors and a plurality of stators. In such examples, the first and second brakes 204a, 204b are multiple disc brakes. In other examples, the first and second brakes 204a, 204b may not be multiple-disc brakes. It will be understood that the type of brakes used in an aircraft landing gear assembly depends on the characteristics of the aircraft in question, such as size, carrying capacity and the like.

When the first and second brakes 204a, 204b are applied to reduce the speed of the aircraft 100, their temperature is likely to increase. When the aircraft 100 travels along the ground supported by the landing gear assembly 102, the rotors rotate with their respective wheels, whereas the stators, the pressure plates and the reaction plates do not rotate. When the first and second brakes 204a, 204b are applied, the pressure plates are urged towards the respective reaction plates so that the brake discs come into contact with one another and friction acts to inhibit the rotational motion of the rotors, thus generating a braking force. A mechanism by which components of the first and second brakes 204a, 204b heat up is the action of friction.

The first and second brakes 204a, 204b may heat up differently depending upon the variation between the first and second brakes 204a, 204b of factors such as the wear state, effectiveness of brake cooling fans associated with the brakes, amount of braking energy absorbed, environmental temperature in the immediate vicinity of the brakes, airflow near the brakes, and the like.

The first and second brakes 204a, 204b may be hydraulically actuated or electrically actuated. That is, the respective brake discs of the first and second brakes 204a, 204b may be urged together by a hydraulic system or an electrical system. Although the teachings in the following examples apply to electrically actuated brakes, the following examples are in the context of hydraulically actuated brakes in which hydraulic pressure in employed to urge the brake discs together.

Each flight of the aircraft 100 may be considered to have various different phases. A phase during which the aircraft 100 taxis from a departure gate to a runway for take-off may be referred to as a taxi-out phase. The first and second brakes 204a, 204b can be used to reduce the speed of the aircraft 100 during this phase. The temperature of the first and second brakes 204a, 204b may therefore rise during the taxi-out phase. A subsequent phase during which the aircraft 100 is airborne after take-off may be referred to as an in-flight phase. As used herein, the in-flight phase is referred to as the phase between when the aircraft 100 lifts off the ground and when the aircraft 100 subsequently touches down at landing. Once the aircraft 100 has taken off, the landing gear assembly 102 is retracted into the landing gear bay 200. Although the first and second brakes 204a, 204b may be applied during the in-flight phase, for example, to prevent rotation of the first and second wheels 104a, 104b within the landing gear bay 200, or, for instance, as part of in-flight system tests, the first and second brakes 204a, 204b are not applied to reduce the speed of the aircraft 100 and therefore are unlikely to experience further temperature increases. The first and second brakes 204a, 204b can therefore cool during the in-flight phase when the landing gear assembly 102 is in the retracted position 202 within the landing gear bay 200.

Subsequently to the in-flight phase, the first and second brakes 204a, 204b may be used during landing and subsequent taxiing to an arrival gate. The taxiing after landing may be referred to as the taxi-in phase.

The first and second brakes 204a, 204b may each have a preferred temperature range for operation. Use of the first and second brakes 204a, 204b at temperatures above such temperature ranges may be avoided for safe operation. For example, it may be a requirement that the first and second brakes 204a, 204b are at or below a dispatch temperature before the aircraft 100 can be permitted to commence a taxi-out phase for a subsequent flight. The application of the first and second brakes 204a, 204b during the flight (e.g. during taxi-out, landing and taxi-in) may have caused an increase in their temperatures above the dispatch temperature, for example. The aircraft 100 may not be cleared to taxi-out for the subsequent flight until the first and second brakes 204a, 204b are at or below the dispatch temperature. Having to wait for the first and second brakes 204a, 204b to become sufficiently cool for dispatch may increase the "turn-around time" of the aircraft 100.

The amount of time required for a given brake to cool by a given temperature amount depends on various factors such as the physical properties of the given brake and environmental conditions in the immediate vicinity of the given brake. The physical properties of the given brake include the specific heat capacity of the given brake and the mass of the given brake, for example. The first brake 204a may cool at a different speed as compared to the second brake 204b. For example, the first brake 204a may require less time to cool to the dispatch temperature before the subsequent flight than the second brake 204b. In this case, an increase in the turn-around time of the aircraft 100 is caused due to the additional time required for the second brake 204b to cool to the dispatch temperature. It may be advantageous, for minimizing the turn-around time, to ensure that the first and second brakes 204a, 204b cool to the dispatch temperature at about the same time.

As described, the first and second brakes 204a, 204b may be allowed to cool during the in-flight phase when the landing gear assembly 102 is retracted into the landing gear bay 200. The first and second brakes 204a, 204b may cool at different speeds within the landing gear bay 200 at least in part due to their relative position. For example, the rate of cooling of the first brake 204a may be higher than the rate of cooling of the second wheel brake. In the described examples, the first retracted position 206a (where the first brake 204a is disposed during the flight) is closer to a landing gear bay door 210 than the second retracted position 206b. Areas within the landing gear bay 200 close to the landing gear bay door 210 may be at lower temperatures (especially at high altitudes), for instance, due to the landing gear bay door 210 not forming an atmospheric seal. The environment in the immediate vicinity of the first retracted position 206a may therefore be colder than the environment in the immediate vicinity of the second retracted position 206b.

Furthermore, in the described examples, the second retracted position 206b is above the first retracted position 206a. Heat from the first brake 204a may rise towards the second brake 204b causing the second brake 204b to cool more slowly than the first brake 204a. The manner in which the first and second brakes 204a, 204b cool may also be affected by airflow within the landing gear bay 200.

Figure 3:
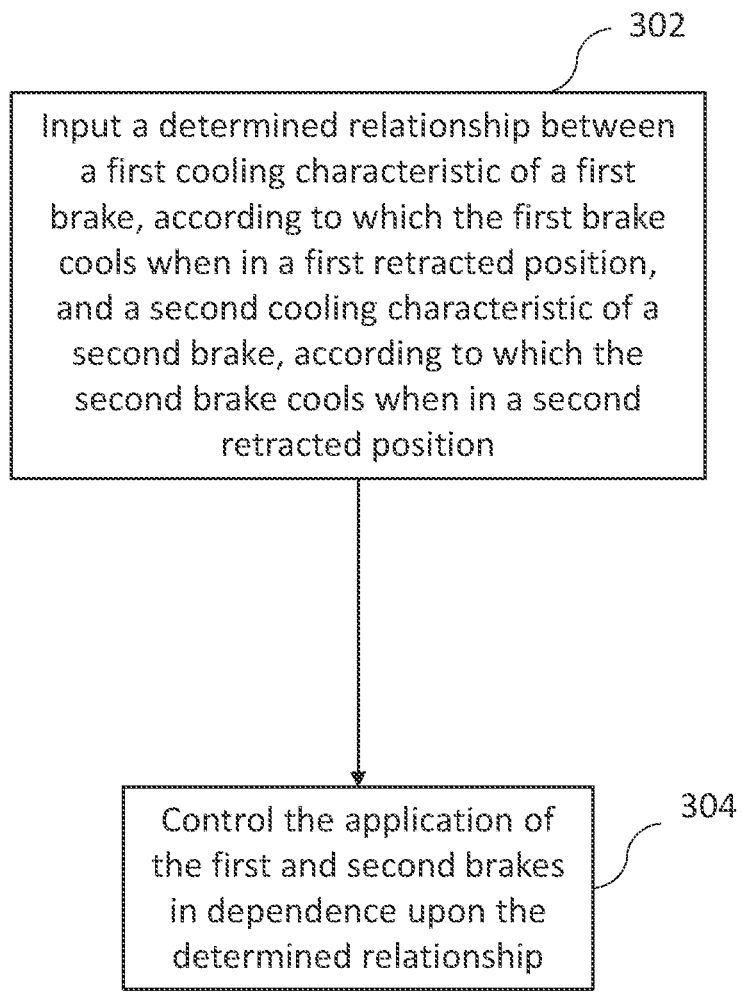
FIG. 3 is a block diagram illustrating a method for controlling the application of aircraft wheel brakes.

FIG. 3 is a block diagram which illustrates a method 300 for controlling the application of aircraft wheel brakes, such as the first and second brakes 204a, 204b. The method 300 is here described in the context of the described examples including the first and second brakes 204a, 204b. The method 300 comprises controlling the application of the first brake 204a and the second brake 204b in dependence upon a determined relationship in order to control the time taken for the first and second brakes 204a, 204b to reach respective specified temperatures. The relationship is determined between a first cooling characteristic of the first brake 204a, according to which the first brake 204a cools when in the first retracted position 206a within the aircraft 100, and a second cooling characteristic of the second brake 204b, according to which the second brake 204b cools when in the second retracted position 206b within the aircraft 100. The method 300 is hereafter described in the context of the described examples.

Specific examples of processing performed as part of the method 300 will now be described. At block 302 of the method 300, the determined relationship between the first cooling characteristic and the second cooling characteristic is input. The first cooling characteristic comprises information which provides an indication of the manner in which the first brake 204a cools when in the first retracted position 206a. Similarly, the second cooling characteristic comprises information which provides an indication of the manner in which the second brake 204b cools when in the second retracted position 206b.

In some examples, the first and second cooling characteristics comprise respective parameters such as a first cooling rate of the first brake 204a according to which the first brake 204a cools when in the first retracted position 206a within the aircraft 100, and a second cooling rate of the second brake 204b according to which the second brake 204b cools when in the second retracted position 206b within the aircraft 100. The first and second cooling rates, or other respective parameters from which the first and second cooling rates can be calculated, may be determined from a computational fluid dynamics (CFD) model. The CFD model may provide information regarding the manner in which the first and second brakes 204a, 204b cool when in the first and second retracted positions 206a, 206b, respectively. In some examples, the first and second cooling rates, or other respective parameters from which the first and second cooling rates can be calculated, may be determined from empirical data obtained from the first and second brakes 204a, 204b (or equivalent brakes from the same manufacturer, for example).

In some examples, the first and second cooling characteristics comprise information obtained from respective brake cooling models. For example, a first brake cooling model for the first brake 204a can be used to predict the time for the first brake 204a to cool, when in the first retracted position 206a, from a given start temperature to a given end temperature. The first brake cooling model may be used to predict respective amounts of time for the first brake 204a to cool from various start temperatures to various end temperatures. In such examples, the first cooling characteristic may comprise, for example, one or more look-up tables indicating the time for the first brake 204a to cool for various sets of start and end temperatures. Similarly, a second brake cooling model may be used to obtain information comprised in the second cooling characteristic.

Similarly, a second brake cooling model for the second brake 204b may be used to predict the time for the second brake 204b to cool, when in the second retracted position 206b, from various start temperatures to various end temperatures, and the second cooling characteristic may comprise one or more look-up tables indicating the time for the second brake 204b to cool for various sets of start and end temperatures.

The first and second brake cooling models may be generated using, for example, the described CFD model. In some examples, the first and second brake cooling models may be generate using, for example, respective CFD models of the first brake 204a when in the first retracted position 206a and the second brake 204b when in the second retracted position 206b. In some examples, the first and second brake cooling models may be generated from the described empirical data. In some examples, a single brake cooling model may be generated for both the first and second brakes 204a, 204b and used to determine the information comprised in the first and second cooling characteristics.

The method 300 may comprise determining at least the first cooling characteristic and/or the second cooling characteristic. The following description is in the context of the first cooling characteristic comprising the first cooling rate as described and the second cooling characteristic comprising the second cooling rate as described. The following description is in the context of a specific way of defining the first cooling rate. However, in other examples, the first cooling rate may be defined differently, so long as it provides an indication of the manner in which the first brake 204a cools when in the first retracted position 206a.

The first cooling rate may be determined using a heat transfer parameter of the first brake 204a for when the first brake 204a is in the first retracted position 206a, the specific heat capacity of the first brake 204a and the mass of the first brake 204a. The first cooling rate $\alpha_1$ may be expressed as follows in Equation (1).

$$\alpha_1 = \frac{HTP_1}{m_1 c_1} \quad (1)$$

In Equation (1), $m_1$ is the mass of the first brake 204a, $c_1$ is the specific heat capacity of the first brake 204a, and $HTP_1$ is the heat transfer parameter of the first brake 204a (hereinafter, first parameter $HTP_1$). The value of the first parameter $HTP_1$ varies depending upon the environmental characteristics in the immediate vicinity of the first retracted position 206a. Hereafter, the environment in the immediate vicinity of the first retracted position 206a is referred to as the environment of the first retracted position 206a. The first parameter $HTP_1$ may be determined for various different sets of environmental characteristics. The first cooling rate $\alpha_1$ may then be determined for various different sets of environmental characteristics using the determined values of the first parameter $HTP_1$ at block 302. For example, the first cooling rate $\alpha_1$ may be determined for sets of environmental characteristics predicted to occur at the first retracted position 206a during the flight. It will be understood that the environmental characteristics may vary during the flight.

In some examples, the first parameter $HTP_1$ may be determined as a function of time during the flight. For example, the change in environmental characteristics at the first retracted position 206a may be taken into account, and the variation of the first parameter $HTP_1$ with time during the flight may be determined. Using this, the first cooling rate $\alpha_1$ as a function of time during the flight may be determined.

The first parameter $HTP_1$ for a given set of environmental characteristics, or as a function of time during the flight, may be determined using the described CFD model or the described empirical data. The first parameter $HTP_1$ may be determined using any technique suitable for determining the cooling properties of an element.

In some examples, values of the first parameter $HTP_1$ may be predetermined, and the predetermined values thereof may be used to determine the corresponding values of the first cooling rate $\alpha_1$ as part of the method 300. In some examples, the relevant values of the first parameter $HTP_1$ may be determined as part of the method 300.

In some examples, the first cooling rate $\alpha_1$ can be used to determine an amount of time for the first brake 204a to cool from a first current temperature to a specified temperature, according to equation (2) here presented.

$$T_{specified} - T_{env1} = (T_{current1} - T_{env1}) e^{-\alpha_1 TTC_1} \quad (2)$$

In Equation (2), $TTC_1$ is the time for the first brake 204a to cool from the first current temperature $T_{current1}$ to the specified temperature $T_{specified}$ and $T_{env1}$ is the temperature of the environment in the immediate vicinity of the first retracted position 206a.

In some examples, the respective specified temperatures of the first and second brakes 204a, 204b may be equal. The described specified temperature $T_{specified}$ may be a temperature both the first and second brakes 204a, 204b are desired to be at when the landing gear assembly 102 is extended for the landing phase of the flight from the landing gear bay 200. The specified temperature $T_{specified}$ may be selected such that the first and second brakes 204a, 204b reach the dispatch temperature after the taxi-in phase after landing at about the same time. The first and second brakes 204a, 204b sharing the same specified temperature $T_{specified}$ assumes that there will be a negligible difference in the time for the first and second brakes 204a, 204b to cool to the dispatch temperature due to braking during the taxi-in phase. However, in examples where this is not the case, the first and second brakes 204a, 204b may have respective different specified temperatures selected such that they cool to the dispatch temperature at about the same time (for example, where the first and second brakes 204a, 204b do not see equal use during the taxi-in phase, do not cool at the same speed due to differences in brake mass, etc.). In the following examples, for simplicity of explanation, it is assumed that the specified temperature $T_{specified}$ is the same for both the first and second brakes 204a, 204b.

As described, the environmental characteristics within the landing gear bay 200 may change during the flight. In some examples therefore, the time to cool may be calculated by determining and summing together a number of time to cool values for intermediate temperature steps (using the appropriate cooling rate for the respective sets of environmental conditions, for example) between a start temperature when the landing gear is retracted and the specified temperature at which the brakes are desired to be when the landing gear is extended during the subsequent landing phase.

The second cooling rate of the second brake 204b, according to which the second brake 204b cools when in the second retracted position 206b, may be determined as part of method 300. Similarly to the first cooling rate $\alpha_1$, the second cooling rate is a parameter which provides an indication of the manner in which the second brake 204b cools when in the second retracted position 206b. The following description is in the context of a specific way of defining the second cooling rate.

The second cooling rate $\alpha_2$ may be determined using a heat transfer parameter of the second brake 204b when the second brake 204b is in the second retracted position 206b, the specific heat capacity of the second brake 204b and the mass of the second brake 204b. The second cooling rate $\alpha_2$ may be expressed as follows in Equation (3).

$$\alpha_2 = \frac{HTP_2}{m_2 c_2} \quad (3)$$

In Equation (3), $m_2$ is the mass of the second brake 204b, $c_2$ is the specific heat capacity of the second brake 204b, and $HTP_2$ is the heat transfer parameter of the second brake 204b (hereinafter, second parameter $HTP_2$). The value of the second parameter $HTP_2$ varies depending upon the environmental characteristics of the second retracted position 206b. The second parameter $HTP_2$ may be determined for various different sets of environmental characteristics. The second cooling rate $\alpha_2$ may then be determined for various different sets of environmental characteristics using the determined values of the second parameter $HTP_2$ at block 302. For example, the second cooling rate $\alpha_2$ may be determined for sets of environmental characteristics predicted to occur at the second retracted position 206b during the flight.

In some examples, the second parameter $HTP_2$ may be determined as a function of time during the flight. For example, the change in environmental characteristics at the second retracted position 206b may be taken into account, and the variation of the second parameter $HTP_2$ with time during the flight may be determined. Using this, the second cooling rate $\alpha_2$ as a function of time during the flight may be determined.

The first and second cooling characteristics may comprise, respectively, the first and second cooling rates $\alpha_1$, $\alpha_2$ as a function of time. In some examples, the first and second cooling characteristics may comprise, respectively, the first and second cooling rates $\alpha_1$, $\alpha_2$ for sets of environmental characteristics predicted to occur, respectively, at the first and second retracted position 206a, 206b during the flight.

As for the first parameter $HTP_1$, the second parameter $HTP_2$ may be determined using the described CFD model or the described empirical data. The second parameter $HTP_2$ may be determined using any technique suitable for determining the cooling properties of an element.

Values of the second parameter $HTP_2$ may be predetermined, or may be determined as part of the method 300. As described, cooling of the second brake 204b may be affected by heat from the first brake 204a in the first retracted position 206a rising towards the second brake 204b in the second retracted position 206b. This effect may be taken into account when the second parameter $HTP_2$ is determined. For example, once the first cooling rate $\alpha_1$ is known, the temperature of the first brake 204a as a function of time during the flight may be determined and taken into account for the determination of the second parameter $HTP_2$.

In some examples, the second cooling rate can be used to determine an amount of time for the second brake 204b to cool from a second current temperature to the specified temperature, according to equation (4) here presented.

$$T_{specified} - T_{env2} = (T_{current2} - T_{env2})e^{-\alpha_2 TTC_2} \quad (4)$$

In Equation (4), the various parameters have the same meaning as in Equation (2), except that they relate to the second brake 204b and the second retracted position 206b, as indicated by the numeral "2" in the subscripts. The time $TTC_2$ for the second brake 204b to cool from the second current temperature $T_{current2}$ to the specified temperature $T_{specified}$ may be calculated by determining and summing together a number of time to cool values of the second brake 204b as described in the context of the first brake 204a.

The determined relationship may indicate the difference in time for the first brake 204a and the second brake 204b to cool from the same start temperature (when the landing gear assembly 102 is first retracted after take-off) to the respective specified temperatures when in their respective retracted positions. In some examples, the determined relationship may indicate a desired temperature difference between the first and second brakes 204a, 204b, when the first brake 204a is moved to the first retracted position 206a and the second brake 204b is moved to the second retracted position 206b, expected to equalize the time taken for the brake to reach the specified temperature (in the case of the brakes having different respective specified temperatures, the time taken for the brakes to reach respective specified temperatures). For example, the desired temperature difference is desired to occur due to the final braking application prior to the landing gear assembly 102 being retracted after take-off. The determined relationship may, for example, be a mathematical relationship between the first cooling rate $\alpha_1$ and the second cooling rate $\alpha_2$.

The determined relationship may also indicate a ratio according to which braking is to be distributed between the first brake 204a and the second brake 204b. The ratio may depend, for example, on the desired temperature difference or time for the first brake 204a and the second brake 204b to cool from the same start temperature to the respective specified temperatures. The method 300 may also comprise determining the relationship between the first cooling characteristic and the second cooling characteristic. For example, as part of method 300, a relationship between the first cooling rate $\alpha_1$ and the second cooling rate $\alpha_2$ may be determined. In some examples, the method 300 may comprise determining the ratio based on the relationship between the first cooling rate $\alpha_1$ and the second cooling rate $\alpha_2$.

At block 304, the application of the first and second brakes 204a, 204b is controlled in dependence upon the determined relationship in order to control the time taken for the first brake 204a and the second brake 204b to reach respective specified temperatures. For example, the application of the first and second brakes 204a, 204b may be controlled in this way during taxiing periods before the landing gear assembly 102 is retracted into the landing gear bay 200. The application of the brakes may be controlled such that the time taken for the brakes to reach the specified temperature is equalized. For example, controlling the application of the first brake 204a and the second brake 204b may comprise applying the first brake 204a in accordance with a first adjustment factor, and applying the second brake 204b in accordance with a second adjustment factor.

The following examples are in the context of the determined relationship indicating a desired temperature difference as described (though in other examples, the described difference in time to cool may be used). The ratio may be determined such that if braking is distributed according to the ratio, the indicated desired temperature difference is expected to be achieved during the final braking application before the landing gear assembly 102 is retracted into the landing gear bay 200.

In some examples, the ratio may be a ratio of torque to be reacted by the first and second brakes 204a, 204a to achieve the indicated desired temperature difference. In such examples, block 304 comprises distributing braking among the first and second brakes 204a, 204b such that torque is reacted by the first and second brakes 204a, 204b according to the ratio. It will be understood that an amount of torque reacted by a brake is related to an amount of energy absorbed by that brake and to the temperature increase thus undergone by that brake. Therefore, a torque ratio may readily be determined which corresponds to the indicated desired temperature difference (taking into account respective brake mass values and specific heat capacity values, etc.).

Braking may be requested when a pilot of the aircraft 100 depresses a brake pedal, or the like. This may generate a braking request which is received by a braking system of the aircraft 100. The braking system may then apply the brakes of the aircraft 100 according to the braking request. The braking request may comprise information relating to a requested braking intensity (e.g. based on how far the brake pedal is pushed by the pilot). The braking system may generate respective brake signals according to which brakes are to be applied. Without the application of any ratio, equal brake signals may be provided to each brake such that equal braking pressure is applied to each brake. Braking pressure is, for example, hydraulic pressure applied to urge the brake discs towards one another (for hydraulically actuated brakes).

In some examples, the first adjustment factor for the first brake 204a and the second adjustment factor for the second brake 204b is determined according to the torque ratio. A first brake signal for the first brake 204a is adjusted based on the first adjustment factor and a second brake signal for the second brake 204b is adjusted based on the second adjustment factor. Thus, adjusted brake signals are generated so that the torque ratio is achieved.

It will be appreciated that each brake has a brake gain, which defines how much torque is developed per unit of pressure applied. This brake gain can vary from brake to brake (e.g. due to manufacturing tolerances), meaning that each brake may develop a different level of braking torque for the same level of applied pressure. The torque ratio may take account of the respective gains of the first and second brakes 204a, 204b.

Block 304 may comprise adjusting the brake pressure applied to the first and second brakes 204a, 204b based on measurements received from a first torque sensor associated with the first brake 204a, and a second torque sensor associated with the second brake 204b. The devices 108 may comprise the first torque sensor for providing an indication of torque reacted by the first brake 204a and the second torque sensor for providing an indication of torque reacted by the second brake 204b. The braking system may receive the respective indications of the reacted torque. The braking system may update the first and second adjustment factors, as required, if the torques reacted by the first and second brakes 204a, 204b are not in accordance with the torque ratio. The braking system may employ a feed-back loop to ensure that the torque ratio is achieved. For example, the braking system may employ a proportional integral derivative (PID) control loop, or another suitable control loop.

In other examples, the ratio may be a ratio of braking pressure to be applied to the first and second brakes 204a, 204a to achieve the indicated desired temperature difference. In such examples, block 304 comprises distributing braking among the first and second brakes 204a, 204b by applying braking pressure to the first and second brakes 204a, 204b according to the ratio. The braking pressure ratio may be determined using respective brake gains of the first and second brakes 204a, 204b and the torque ratio, for example. In other examples, experimentation may be undertaken to determine the brake pressure ratio which results in the indicated desired temperature difference. For example, experiments may be conducted on brakes form the same manufacture which correspond to the first and second brakes 204a, 204b (in terms of mass, other physical properties, etc.).

In these examples, the first adjustment factor and the second adjustment factor is determined according to the braking pressure ratio. As described in the context of the torque ratio, the first brake signal for the first brake 204a is adjusted based on the first adjustment factor and the second brake signal for the second brake 204b is adjusted based on the second adjustment factor such that adjusted brake signals are generated so that the braking pressure ratio is achieved.

There may be a difference between the brake pressure intended to be provided responsive to a brake signal and the actual brake pressure applied to the brake in question. Block 304 may comprise adjusting the brake pressure applied to the first and second brakes 204a, 204b based on measurements received from a first brake pressure sensor associated with the first brake 204a and a second brake pressure sensor associated with the second brake 204b. The devices 108 may comprise the first brake pressure sensor for providing an indication of the actual brake pressure applied to the first brake 204a and the second brake pressure sensor for providing an indication of the actual brake pressure applied to the second brake 204b. The braking system may receive respective indications of the actual brake pressure applied. The braking system may update the first and second adjustment factors, as required, if the actual respective brake pressures applied to the first and second brakes 204a, 204b are not in accordance with the brake pressure ratio. The braking system may employ a feed-back loop to ensure that the brake pressure ratio is achieved, as described.

Although the described examples of torque ratio and braking pressure ratio are in the context of achieving the indicated desired temperature difference, in other examples, the torque ratio or the braking pressure may be determined based on the difference in time for the first brake 204a and the second brake 204b to cool from the same start temperature to the specified temperature when in their respective retracted positions. It will be appreciated that the purpose of applying the torque ratio or the braking pressure ratio is to control (e.g. equalize) the time taken for the first and second brakes 204a, 204b to reach the specified temperature.

In examples in which the determined relationship indicates a desired temperature difference of the first and second brakes 204a, 204b as previously described, braking application may be controlled without use of a ratio. In such examples, block 308 may comprise distributing braking among the first brake 204a and the second brake 204b by applying brake pressure to the first brake 204a and the second brake 204b in a manner so as to achieve the desired temperature difference. In such examples, block 304 may comprise adjusting brake pressure applied to the first and second brakes 204a, 204b based on measurements received from a first temperature sensor associated with the first brake 204a and a second temperature sensor associated with the second brake 204b.

The devices 108 may comprise the first brake temperature sensor for providing an indication of the temperature of the first brake 204a, and the second brake temperature sensor for providing an indication of the temperature of the second brake 204b. In such examples, the first adjustment factor and the second adjustment factor are determined based on the indications of the respective temperatures of the first and second brakes 204a, 204b so as to achieve the indicated temperature difference. The braking system may continue to receive the indications of temperature and to adjust the adjustment factors so as to adjust the braking pressure applied to the first and second brakes 204a, 204b to achieve the indicated desired temperature difference.

Alternatively to using temperature sensors, in examples where braking is distributed in a manner so as to achieve the desired temperature difference, the respective temperatures of the first and second brakes 204a, 204b may be estimated. The estimation may be performed by the computing system 106, for example. In some examples, the temperature of a given brake after a given brake application may be estimated from an amount of energy input into that given brake. For example, the torque reacted by the given brake may be measured (e.g. using a torque sensor) and multiplied by the wheel speed of the wheel associated with the given brake. The result may then be integrated over time to determine the amount of energy input into the given brake. Using the input energy, the mass of the given brake and the specific heat capacity of the given brake, a temperature change of the given brake may be determined. The temperature of the given brake due to the given brake application may be determined from the temperature change using the initial temperature of the given brake before the given brake application. The initial temperature may be known from previous iterations of the estimation or may be taken to be the environmental temperature (in the case of the given brake application being the first of the day).

The first and second adjustment factors may be normalized such that the total braking applied responsive to the first and second brake signals is in accordance with the requested braking intensity. In the described examples, the braking system may update the first and second adjustment factors at a fast rate in order to maintain the torque ratio, the brake pressure ratio or the desired temperature difference during braking. For example, the braking system may update the adjustment factors at a rate up to the rate at which the first and second torque sensors, brake pressure sensors or the brake temperature sensors provide updated measurements.

It will be appreciated that the mass of the first and second brakes 204a, 204b may change during the life of the brakes due to wear. Wear of the first and second brakes 204a, 204b may be measured or predicted in order to obtain an indication of the change in mass. It will be appreciated that wear causes the length of the brake discs to reduce. Wear state may be represented as a reduction in length of the brake discs and a change in mass may be calculated using the physical dimensions and the density of the brake discs. As described, the mass of the first and second brakes 204a, 204b may be used to determine the respective first and second cooling characteristics. Therefore, in some examples, the first cooling characteristic may be determined based on a first wear indication which indicates the wear state of the first brake 204a; and/or the second cooling characteristic may be determined based on a second indication which indicates the wear state of the second brake 204b.

For example, each brake may have a wear pin (or the like) associated with it, the length of which wear pin provides an indication of the amount of brake wear (due to a reduction in length of the brake discs when pressed together). In some examples, the first indication may be provided by a first wear pin associated with the first brake 204a, the second indication may be provided by a second wear pin associated with the second brake 204b and the respective first and second cooling characteristics may be determined based on the first and second indications. For example, measurements from respective wear pins may be used to obtain an indication of the change in mass of the brakes and respective updated values of mass may be used to determine the first and second cooling characteristics.

In other examples, the first and second brakes 204a, 204b may be expected to undergo certain amounts of wear per flight, and the amount of wear may be predicted based on the number of flights that have taken place to generate the first and second indications. Relevant parts of the method 300 may be repeated in order to take account of changes in brake mass as the amount of wear of the first and second brakes 204a, 204b advances. For example, updated mass values may be input and the first and second cooling rates $\alpha_1$, $\alpha_2$ re-determined, etc.

The described brake signals may be sent to a brake controller (comprised in the aircraft 100) which causes the brake pressure to be applied in accordance with the received brake signals. The computing system 106 may implement the described functions of the braking system. The computing system 106 may also implement the described functions of the brake controller by sending the appropriate signals to apparatus which applies brake pressure to the brakes. In some examples, the method 300 may be implemented by the computing system 106 of the aircraft 100. As such, the computing system 106 may be an apparatus for controlling the application of aircraft wheel brakes according to the method 300 and the method 300 may be performed by the computing system 106. For example, one or processors of the computing system 106 may execute instructions stored on one or more computer readable storage media of the computing system 106 to perform the described examples of the method 300. For example, the one or more processors of the computing system 106 may be configured to determine a first cooling characteristic of a first wheel brake of an aircraft according to which the first wheel brake cools when in a first retracted position within the aircraft, and determine a second cooling characteristic of a second wheel brake of the aircraft according to which the second wheel brake cools when in a second retracted position within the aircraft. The one or more processors may be configured to determine a relationship between the first cooling characteristic and the second cooling characteristic, and control the application of the first wheel brake and the second wheel brake in dependence upon the determined relationship.

In some examples, parts of the described examples of the method 300 may be performed by apparatus remote from the aircraft 100. For example, certain parts of the method 300 may be performed by computing apparatus 400 shown in FIG. 4 disposed remote from the aircraft 400. As such, the computing system 106 and the computing apparatus 400 may together form a system for controlling the application of aircraft wheel brakes to control the time taken for the aircraft wheel brakes to reach respective specified temperatures.

The computing apparatus 400 comprises a processor 402 and a computer readable storage medium 404. The processor 402 may perform certain parts of the method 300 as described. For example, the computing apparatus 400 may determine the first and second cooling characteristics. The results of the parts of the method 300 performed by the computing apparatus 400 may be used as input information into the computing system 106 of the aircraft 100 which then performs the remainder of the method 300. In some examples, the relationship between the first and second cooling characteristics may be determined by the computing apparatus 400. In some examples, the computing apparatus 400 may determine some of the information indicated by the described determined relationship, and the computing system 106 may determine other information indicated by the described determined relationship.

For example, the computing system 106 may receive, as input at block 302 of the method 300, the desired temperature difference from the computing apparatus 400 and may determine a described example of the ratio. In other examples, the computing apparatus 400 may determine all the information indicated by the determine relationship which may then be received by the computing system 106 at block 302 as an input. The determined relationship may then be input into the computing system 106 for block 304 to be performed with respect to the first and second brakes 204a, 204b. The inputs determined at the computing apparatus 400 may be input into the computing system 106 of the aircraft 100 by a user of the computing system 106. In some examples, the computing apparatus 400 may additionally comprise wireless communication elements for transmitting the determined input information to the computing system 106. In such examples, the computing system 106 also comprises wireless communication elements for receiving the input information transmitted by the computing apparatus 400.

In some examples, the apparatus 400 may receive information from the computing system 106 (or otherwise from the aircraft 100) in order to perform certain parts of the method 300. For example, the apparatus 400 may receive the described first and second indications which indicate the respective wear states of the first and second brakes 204a, 204b. The apparatus 400 may then determine the first and second cooling characteristics based on the received indications. The apparatus 400 may repeat relevant parts of the method 300 when new indications are received from the aircraft 100.

All or part of the instructions for performing the described methods may be generated and/or the methods may be performed using any suitable software or combination of software. In one example, "MATLAB" may be used to generate all or part of the instructions for respective processors to carry out any of the described examples of methods. In other examples, other software packages may be used. For example, any suitable programming language, development environment, software package, or the like may be used. Other examples of programming languages include PYTHON, C++, C, JAVASCRIPT, FORTRAN etc.

Although the invention has been described above with reference to one or more preferred examples, it will be appreciated that various changes or modifications may be made without departing from the scope of the invention as defined in the appended claims.

The invention claimed is:

1. A method of controlling application of aircraft wheel brakes, the method comprising:
controlling application of a first wheel brake of an aircraft and a second wheel brake of the aircraft in dependence upon a determined relationship in order to control a period during which the first wheel brake and the second wheel brake reach respective specified temperatures,
wherein, the relationship is determined between a first cooling characteristic of the first wheel brake, according to which first cooling characteristic the first wheel brake cools when in a first retracted position within the aircraft, and a second cooling characteristic of the second wheel brake, according to which second cooling characteristic the second wheel brake cools when in a second retracted position within the aircraft.

2. The method according to claim 1, comprising determining at least the first cooling characteristic and/or the second cooling characteristic.

3. The method according to claim 2, wherein:
the first cooling characteristic is determined based on a first wear indication which indicates the wear state of the first wheel brake; and/or
the second cooling characteristic is determined based on a second indication which indicates the wear state of the second wheel brake.

4. The method according to claim 1, comprising determining the relationship between the first cooling characteristic and the second cooling characteristic.

5. The method according to claim 1, wherein the respective specified temperatures are equal.

6. The method according to claim 1, wherein the determined relationship indicates a desired temperature difference between the first wheel brake and the second wheel brake, when the first wheel brake is moved to the first retracted position and the second wheel brake is moved to the second retracted position, expected to equalize the period during which the first and second wheel brakes reach the respective specified temperatures.

7. The method according to claim 6, comprising:
distributing braking among the first wheel brake and the second wheel brake by applying brake pressure to the first wheel brake and the second wheel brake in a manner so as to achieve the desired temperature difference.

8. The method according to claim 7, wherein the method comprises:
adjusting brake pressure applied to the first wheel brake and the second wheel brake based on measurements received from a first temperature sensor associated with the first wheel brake and a second temperature sensor associated with the second wheel brake.

9. The method according to claim 1, wherein:
the determined relationship indicates a ratio according to which braking is to be distributed between the first wheel brake and the second wheel brake.

10. The method according to claim 9, wherein the method comprises:
distributing braking among the first wheel brake and the second wheel brake by applying braking pressure to the first wheel brake and the second wheel brake according to the ratio.

11. The method according to claim 10, wherein the method comprises:
adjusting the brake pressure applied to the first wheel brake and the second wheel brake based on measurements received from a first brake pressure sensor associated with the first wheel brake and a second brake pressure sensor associated with the second wheel brake.

12. The method according to claim 9, wherein the method comprises:
distributing braking among the first wheel brake and the second wheel brake such that torque is reacted by the first wheel brake and the second wheel brake according to the ratio.

13. The method according to claim 12, wherein the method comprises:
adjusting the brake pressure applied to the first wheel brake and the second wheel brake based on measurements received from a first torque sensor associated with the first wheel brake a second torque sensor associated with the second wheel brake.

14. The method according to claim 1, wherein:
the first cooling characteristic comprises a first cooling rate according to which the first wheel brake cools when in the first retracted position within the aircraft; and
the second cooling characteristic comprises a second cooling rate according to which the second wheel brake cools when in the second retracted position within the aircraft.

15. The method according to claim 14, wherein the rate of cooling of the first wheel brake is higher than the rate of cooling of the second wheel brake.

16. The method according to claim 1, wherein controlling the application of the first wheel brake and the second wheel brake comprises:
applying the first wheel brake in accordance with a first adjustment factor; and
applying the second wheel brake in accordance with a second adjustment factor.

17. The method of claim 1, wherein, the first cooling characteristic differs from the second cooling characteristic.

18. A system for controlling the application of aircraft wheel brakes to control the time taken for the aircraft wheel brakes to reach respective specified temperatures, the system comprising one or more processors configured to:
determine a first cooling characteristic of a first wheel brake of an aircraft according to which the first wheel brake cools when in a first retracted position within the aircraft;
determine a second cooling characteristic of a second wheel brake of the aircraft according to which the second wheel brake cools when in a second retracted position within the aircraft;
determine a relationship between the first cooling characteristic and the second cooling characteristic; and
control the application of the first wheel brake and the second wheel brake in dependence upon the determined relationship.

19. The system of claim 18, wherein, the first cooling characteristic differs from the second cooling characteristic.

20. An apparatus for controlling the application of aircraft wheel brakes, the apparatus comprising a processor configured to:
control the application of a first wheel brake of an aircraft and a second wheel brake of the aircraft in dependence upon a determined relationship in order to control the time taken for the first wheel brake and the second wheel brake to reach respective specified temperatures,
wherein, the determined relationship is determined between a first cooling characteristic of the first wheel brake, according to which the first wheel brake cools when in a first retracted position within the aircraft, and a second cooling characteristic of the second wheel brake, according to which the second wheel brake cools when in a second retracted position within the aircraft.

21. The apparatus of claim 20, wherein, the first cooling characteristic differs from the second cooling characteristic.

* * * * *